US006639957B2

(12) United States Patent
Cahill-O'Brien et al.

(10) Patent No.: US 6,639,957 B2
(45) Date of Patent: Oct. 28, 2003

(54) METHOD AND SYSTEM FOR CALIBRATING AN OSCILLATOR CIRCUIT USING A NETWORK BASED TIME REFERENCE

(75) Inventors: Barry Cahill-O'Brien, Spokane, WA (US); Robert V. Dusenberry, Newman Lake, WA (US)

(73) Assignee: Itron, Inc., Spokane, WA (US)

( * ) Notice: Subject to any disclaimer, the term of this patent is extended or adjusted under 35 U.S.C. 154(b) by 88 days.

(21) Appl. No.: 10/076,299

(22) Filed: Feb. 14, 2002

(65) Prior Publication Data

US 2003/0152177 A1 Aug. 14, 2003

(51) Int. Cl.[7] .............................. H03C 7/00; H04L 7/00
(52) U.S. Cl. ...................... 375/354; 331/1 R; 331/176; 713/502
(58) Field of Search .......................... 375/354; 331/1 R, 331/4, 10, 16, 176; 348/500; 713/400, 500, 502, 600

(56) References Cited

U.S. PATENT DOCUMENTS

| 5,552,749 A | | 9/1996 | Nowatski et al. | |
|---|---|---|---|---|
| 5,565,923 A | * | 10/1996 | Zdepski | 375/240.26 |
| 5,572,169 A | | 11/1996 | Iwamoto | |
| 5,826,066 A | * | 10/1998 | Jardine et al. | 713/400 |
| 5,966,387 A | * | 10/1999 | Cloutier | 370/516 |
| 6,064,270 A | | 5/2000 | Douglas | |
| 6,373,294 B1 | * | 4/2002 | Bentley | 327/106 |
| 6,542,044 B1 | * | 4/2003 | Berquist et al. | 331/176 |

* cited by examiner

Primary Examiner—Young T. Tse
(74) Attorney, Agent, or Firm—Patterson, Thuente, Skaar & Christensen, P.A.

(57) ABSTRACT

A method and system of compensating for reference frequency drift utilizes time stamps from a networked reference clock to adjust a local crystal oscillator of a communications device. In an example embodiment, a microprocessor arrangement of the communications device obtains a synchronization time stamp from a networked clock arrangement and synchronizes the local oscillator clock and a clock circuit of the microprocessor with the time stamp. After a predetermined time duration has transpired, a calibration time stamp is obtained from the network clock and the difference between the calibration time stamp and the current time of the clock circuit is extracted. The clock circuit and the networked clock arrangement are then synchronized and the local crystal oscillator is adjusted for crystal aging as a function of the difference between the calibration time stamp and the current time of the clock circuit.

22 Claims, 2 Drawing Sheets

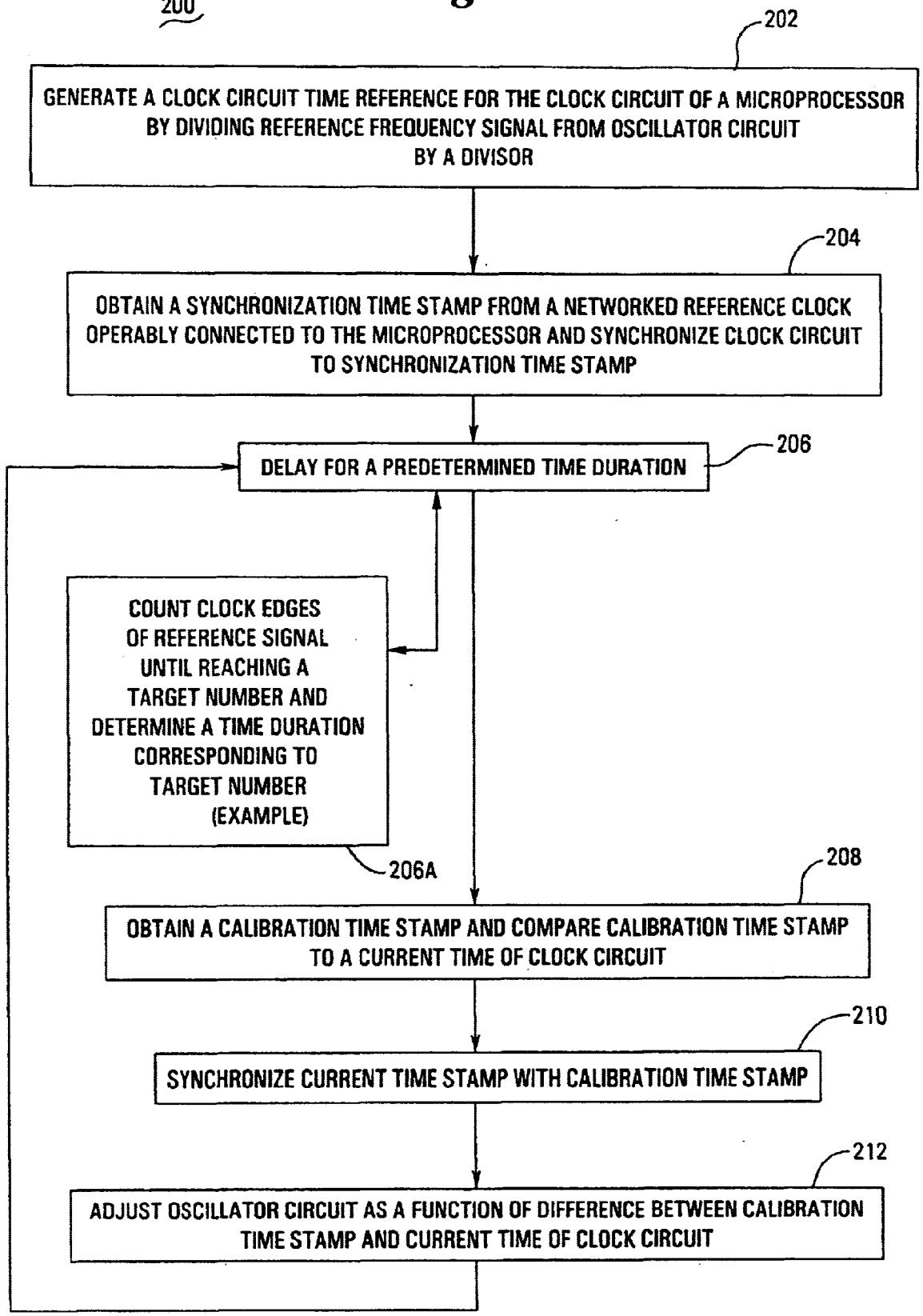

METHOD AND SYSTEM FOR CALIBRATING AN OSCILLATOR CIRCUIT USING A NETWORK BASED TIME REFERENCE

FIELD OF THE INVENTION

The present invention generally relates to calibrating an oscillator circuit in a transmitter. More particularly, the present invention relates to a method and a system for automatically calibrating an oscillator circuit that shifts in frequency, primarily due to aging of an oscillator crystal and/or seasonal changes in ambient temperature.

BACKGROUND OF THE INVENTION

Most radio frequency (RF) communications equipment require an accurate and precise reference frequency with low frequency drift characteristics to maintain stable communications with other RF communication equipment. In some applications, the FCC imposes the requirement that an RF transmitter maintain very high frequency accuracy over the life span of the equipment and that the transmitters operate within narrow channels. In outdoor applications, the frequency accuracy must be maintained over a wide temperature range. The accuracy of the transmit frequency is directly related to the accuracy of the oscillator circuit used in the transmitter.

Crystal oscillators are often used in RF transmission equipment to provide the requisite reference frequencies. However, crystal oscillators are susceptible to frequency drift, primarily due to crystal aging, and to frequency shifts that are primarily caused by variations in ambient temperature. One approach to resolving issues of frequency drift caused by crystal aging and ambient temperature variations involves using voltage-controlled, temperature-compensated crystal oscillators. A temperature-compensated crystal oscillator is typically an open-loop device that includes a temperature sensing circuit that outputs a control signal to a frequency tuning circuit connected to the crystal oscillator. Unfortunately, temperature-compensated crystal oscillators often include additional automatic frequency control (AFC) loops and analog tuning devices that occupy valuable circuit board space and consume power. In addition, temperature-compensated crystal oscillators circuits typically have a limited ability to compensate for oscillator frequency drift due to crystal oscillator aging. Examples of these types of crystal oscillator circuits include U.S. Pat. Nos. 6,064,270, 5,572,169, and 5,552,749.

Another approach to minimizing aging effects of the crystal oscillator includes enclosing the oscillator inside a miniature oven to reduce the potential for stresses on the crystal caused by ambient temperature changes. Unfortunately, oven controlled oscillators are expensive and consume large amounts of power. Consequently, oven controlled crystal oscillators are impractical for applications requiring low cost, low power consuming temperature-compensating oscillator circuits.

Crystal oscillators that are exposed to varying ambient temperatures over a long period of time exhibit changes in the crystal structure that cause the crystal's resonant frequency to shift. By applying a voltage to a calibration pin on the oscillator, the frequency can be adjusted back to the original specified frequency. A typical error due to aging is about 0.5 parts per million (PPM) drift in frequency per year. In some applications, the FCC usually requires that the frequency drift due to aging not exceed about 1.5 PPM over the life of the transmitter. Temperature-compensation crystal oscillator circuits typically are designed to maintain the oscillator within 1.0 PPM, in which case the oscillator circuit must be manually recalibrated at least once a year in order to ensure compliance with FCC requirements. For oscillators used in transmitters that have restricted access, such as utility pole mounted transmitters, calibrating these oscillators on an annual basis is simply impractical.

Hence, a need exists for a method and a system for compensating the reference frequency of transmitters with crystal oscillator circuits that is low cost, consumes low power and substantially reduces any labor cost involved in calibrating the oscillator circuit.

SUMMARY OF THE INVENTION

Various embodiments of the present invention are directed to addressing the above and other needs in connection with compensating for reference frequency drift in a communications device having a crystal oscillator circuit that uses a network time protocol (NTP) as a time reference for calibrating the reference frequency without the need for manual recalibration.

According to one aspect of the invention, a method of compensating for reference frequency drift in a communications device utilizes time stamps obtained from a networked reference clock arrangement to adjust a local crystal oscillator circuit of the communications device. The local oscillator circuit generates a reference frequency signal and operates synchronously with a clock circuit of a microprocessor arrangement. The reference frequency compensation method includes generating a clock circuit time reference for the clock circuit by dividing the reference frequency signal by a divisor and obtaining a synchronization time stamp from a networked reference clock arrangement that is operably connected to the microprocessor arrangement. The clock circuit is then synchronized to the synchronization time stamp. The method also includes obtaining a calibration time stamp from the networked reference clock arrangement after a predetermined time duration has transpired from synchronization of the clock circuit and comparing the calibration time stamp to a current time of the clock circuit. The method further includes synchronizing the current time of the clock circuit with the calibration time stamp and adjusting the local oscillator circuit as a function of a time variation between the calibration time stamp and the current time of the clock circuit.

According to another aspect of the invention, a reference frequency compensation circuit arrangement having a local crystal oscillator circuit utilizes time stamps from a networked reference clock to calibrate the local crystal oscillator. The frequency compensation circuit arrangement includes a dividing circuit that divides a reference frequency signal from the local oscillator circuit and generates a clock circuit time reference. The compensation circuit arrangement also includes a microprocessor arrangement with a clock circuit that is operably connected to a networked reference clock arrangement, the microprocessor arrangement can obtain a synchronization time stamp from the reference clock arrangement and can synchronize the clock circuit time reference to the synchronization time stamp. The microprocessor arrangement can also obtain a calibration time stamp from the networked reference clock arrangement after a predetermined time duration from the synchronization of the clock circuit has transpired. The microprocessor then compares the calibration time stamp to a current time stamp of the clock circuit. The microprocessor arrangement then synchronizes the current time reference of the clock circuit with the calibration time stamp and adjusts the local oscillator circuit as a function of a time variation between the calibration time stamp and the current time of the clock circuit. In a related embodiment, the time stamps are obtained from a fixed clock reference, such as an atomic clock. In the example, the oscillator can also be compensated for seasonal changes in ambient temperature.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a flowchart illustrating a method of compensating for frequency drift in an oscillator circuit of a radio frequency transmitter according to the present invention.

Figure 1:
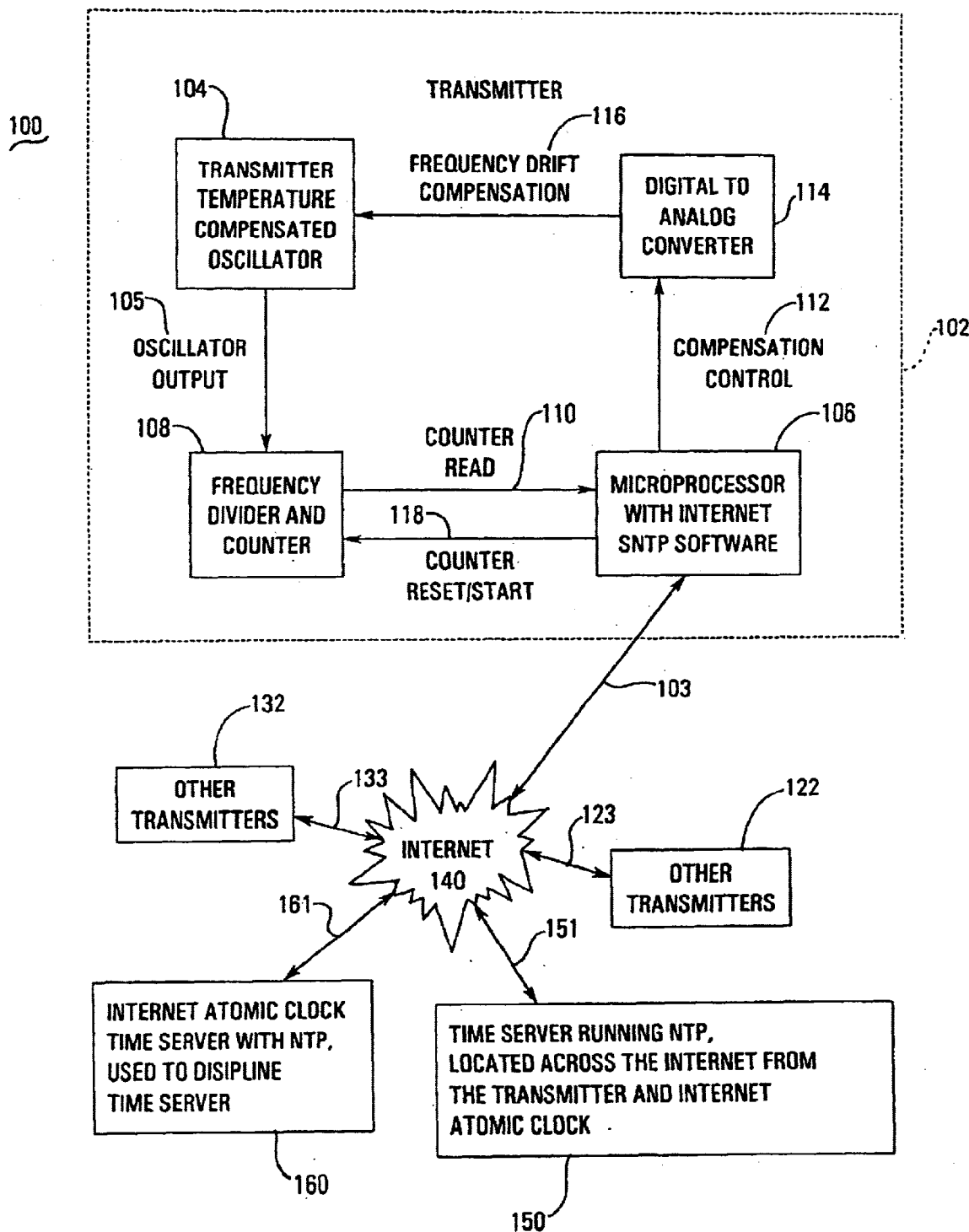
FIG. 1 is a block diagram illustrating a system for compensating for reference frequency drift in an oscillator circuit using a time stamp from an information network according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

The present invention is generally directed to a method and system for compensating for reference frequency drift in a communications device having a crystal oscillator circuit using a network time protocol as a time reference. While the present invention is not necessarily limited to such an application, the invention will be better appreciated using a discussion of example embodiments in such a specific context.

In an example embodiment, a crystal oscillator circuit in a transmitter can be wirelessly calibrated to compensate for frequency drift by synchronizing the clock of the oscillator circuit with a time stamp obtained from an Internet Atomic clock networked time server running the Network Time Protocol (NTP) software. A microprocessor in the transmitter obtains a time stamp from the time server, preferably via a wireless connection to the Internet or alternatively via a wired connection, and compares the time stamp with the clock of the oscillator circuit. The oscillations of the slowed reference frequency are counted until a target number is reached. The microprocessor determines the time difference or variation between the time stamp and the time resulting from the counted oscillations. Where the time difference between the networked time server and the transmitter clock exceeds a certain threshold, the microprocessor sends a correction signal to recalibrate the oscillator circuit.

In a related embodiment, the time stamp can also be obtained by the transmitter via an Internet connection to, or via a direct wireless connection, a networked server that is already synchronized with the Internet time server. In another related embodiment, the time server can be coupled to a standalone atomic clock that serves as the fixed time reference for the time server and the transmitters communicating with the time server.

FIG. 1 is a block diagram that illustrates a system for compensating for reference frequency drift in an oscillator circuit using a time stamp from an information network according to the present invention. In particular, system 100 includes transmitters 102, 122 and 132 that communicate via channels 103, 123 and 133 through the Internet 140 to a time server arrangement 150. Time server arrangement 150 is configured to execute various software applications including a Network Time Protocol (NTP) application, which is a software application used by users of the Internet to synchronize computer clocks. In this example embodiment, transmitters 102, 122 and 132 use time server arrangement 150 to adjust and synchronize their own internal computer clocks. Communications channels 103, 123 and 133 facilitate the transmission of data from the transmitters to servers, such as server arrangement 150, either directly or via the Internet 140. In one example embodiment, channels 103, 123 and 133 are wireless communication channels that include radio frequency signals communicating in the 900 MHz range. Other connection alternatives include land lines, optical fibers or cabling to and short distance RF such as Bluetooth.

In this example embodiment, time server arrangement 150 communicates via a channel 151 through Internet 140 to an atomic clock time server arrangement 160 via another channel 161. Time server arrangement 160 includes NTP application software that is synchronized with Internet atomic clocks to ensure precision of the time reference and time stamps generated by time server 160. In this example embodiment, server arrangement 150 synchronizes its own internal clock with atomic clock time server 160 via Internet 140, thereby providing transmitters 102, 122 and 132 with an accurate time reference from which to synchronize their own internal clocks. In a related embodiment, communicating wirelessly through channels 151 and 161 provides flexibility in locating servers 150 and 160 and facilitates communications between servers.

In one example application, transmitters 102, 122 and 132 form part of a meter reading system that transmit information received from a plurality of remote metering modules (not shown) through Internet 140 to time server arrangement 150 or another server located at a utility's central office. System 100 facilitates the transfer of data to and from the remote metering modules using Internet 140 and without the need for an intermediate level of transmitters (not shown) that normally re-transmit the data received by transmitters 102, 122 and 132 to a central office server. System 100 can transfer data wirelessly, via land lines, or via fiber optic cable.

In a related application, transmitters 102, 122 and 132 that transmit data received from the remote meter modules to the intermediate transmitters can be remotely (wirelessly or via land lines) calibrated to maintain a stable frequency for communication with the intermediate transmitters. With the present approach, meter-reading systems using transmitters that would normally require regular calibrating (due to frequency drift due to crystal aging or seasonal ambient temperature changes) would avoid the capital and maintenance costs of using special reference transmitters to calibrate the other transmitters in the system. By using Internet 140 (or other public/private networks) and the communication capability of each of the transmitters (e.g., 102, 122 and 132), the present invention facilitates automatic adjustment of the reference frequency of the oscillator circuit without the need for field calibration by a technician or removal of the unit from the utility pole and calibration of the transmitter at a service location.

In one example embodiment, transmitter 102 includes a temperature-compensated oscillator circuit 104 having an oscillator output signal 105. The transmitter is configured to operate at a frequency of about 900 MHz. In a related embodiment, an oscillator circuit that is not subject to temperature changes need not include the temperature compensation components and can be solely calibrated with the approach of the present invention. Oscillator output signal 105 feeds into a frequency divider and counter module 108 that is configured to divide down the frequency by a predetermined divisor or factor to a slower frequency such that the clock rate is easier to count. The counter of module 108 can now more easily count the oscillations (or clock edges) in the reduced frequency signal. The output of module 108 (counter read path 110) is input into a microprocessor arrangement 106 having a form of NTP software. In this example application, the time protocol software is the Simple Network Time Protocol (SNTP) that is used between a server and a remote transmitter as a simplified access method for servers and clients using NTP Version 3 (NTP Version 3; RFC-1305 [MIL92]). The access method is similar to the UDP/TIME Protocol and is designed to operate in a dedicated server-client configuration. SNTP is used in this example embodiment because it is faster that NTP. NTP takes longer to synchronize between devices because it cycles various times to resolve any error between devices. SNTP can access the network faster and can be synchronized to within a few hundred microseconds.

The output of microprocessor arrangement 106 is in the form of a compensation control signal 112 intended for oscillator circuit 104. Control signal 112 is reconfigured in a digital-to-analog converter 114 and forwarded to oscillator circuit 104 as a frequency drift compensation signal 116. In this example embodiment, signal 116 instructs oscillator circuit 104 to apply a voltage at a calibration pin to adjust the transmission frequency. Microprocessor arrangement 106 also instructs module 108 via a counter reset/start signal 118 to reset the counter for the next reference frequency verification attempt. In this example, microprocessor arrangement 106 includes a clock circuit that is shared with the oscillator circuit. Further, in this example embodiment, the clock operates at a frequency of 16.8 MHz and includes a number of timers that can be set up as divisions off the 16.8 MHz clocks to easily divide down the frequency.

FIG. 2 is a flowchart 200 illustrating a method of compensating for frequency drift in an oscillator circuit of a radio frequency transmitter according to the present invention. In this example embodiment, the communications device (e.g., transmitter 102) includes a microprocessor arrangement 106 and a local oscillator circuit 104 that generates a reference frequency signal and operates synchronously with a clock circuit (not shown) of microprocessor arrangement 106. In step 202, oscillator circuit 104 generates a time reference for the clock circuit of microprocessor 106 by generating a reference frequency signal that is divided by a dividing circuit 108 having a selectable divisor. In step 204, microprocessor 106 obtains a synchronization time stamp from a reference clock arrangement (e.g., atomic clock time server 160 or network time server 150), the reference clock being operably connected to microprocessor arrangement 106. In a related embodiment, the reference clock arrangement is an atomic clock that is operably coupled to microprocessor 106. The clock circuit of microprocessor 106 is then synchronized to the synchronization time stamp.

In step 206, microprocessor 106 waits for a predetermined time duration to transpire from the initial synchronization of the clock circuit. The manner of determining the time duration will be described later in the specification. At step 208, microprocessor 106 obtains a calibration time stamp from the reference clock arrangement and compares the calibration time stamp to a current time of the clock circuit. The difference between the calibration time stamp and the current time of the clock circuit is extracted and temporarily stored in memory for subsequent use. At step 210, microprocessor 106 then synchronizes the current time of the clock circuit with the calibration time stamp. At step 212, microprocessor 106 adjusts local oscillator circuit 104 by transmitting a compensation control signal 112 via digital/analog converter 114 that results in a frequency drift compensation signal 116. Drift compensation signal 116 functions to adjust the crystal oscillator and therefore the reference frequency. Compensation control signal 112 is a function of a time variation (or difference) between the calibration time stamp and the current time of the clock circuit. The time differential correlates to a frequency drift value that is then used to adjust the crystal oscillator. In this example embodiment, in response to the frequency drift value, microprocessor 106 adjusts the oscillator circuit so as to synchronize the oscillator circuit with server 150 or atomic clock time server 160. The adjustment to oscillator circuit 104 can include sending a voltage to the calibration pin of the oscillator circuit.

To continuously compensate for frequency drift caused by aging of the crystal oscillator, steps 206 through 212 are continuously repeated. For example, once the oscillator circuit is adjusted and the clock circuit synchronized, then microprocessor 106 waits for another predetermined time duration to pass before obtaining a new calibration time stamp at step 208. The calibration time stamp is used for both calibration of the oscillator circuit and synchronization of the clock circuit of the microprocessor.

In a related embodiment, upon obtaining or retrieving the calibration time stamp, the difference in time (local oscillator versus and the network) is immediately extracted and the clocks then immediately synchronized. The operation may occur very quickly, but it is preferably to ensure that the calibration time stamp is fresh enough to be used for both difference in time extraction (for later adjustment of the crystal oscillator) and synchronization. Calibration may take longer (calculating the amount to adjust the oscillator and implementing the adjustment in the local oscillator), however any adjustments made in the crystal oscillator circuit are of the order of parts per million. Therefore, the adjustment can be implemented shortly after the clocks are synchronized.

At step 206, the time duration delay can be implemented in a number of ways including step 206A. Generally, the predetermined time duration is implemented by counting a number of repeatable attributes associated with the reference frequency signal. In the following example embodiment, clock edges of the reference frequency signal are used, but frequency signal oscillations or other repeatable attribute of the signal can be used. Once the repeatable attribute is counted until reaching a target number, a time duration is calculated from and associated with the target number. In the following example, the target number of clock edges corresponds to a particular time.

In this example embodiment, at step 206A, microprocessor 106 counts a plurality of clock edges of the reduced frequency signal until the target number of clock edges is reached. The clock circuit of microprocessor arrangement 106, which is also the clock circuit for the crystal oscillator, operates at 16.8 MHz and is divided down such that 100 edges are detected per second. This simplifies the counting of clock edges for high frequency signals. Upon reaching the target number, the microprocessor determines a time duration corresponding to the target number of clock edges (e.g., predetermined time duration). In this example embodiment, the target number of edges is about one million. With 100 edges occurring per second, it takes about 11.6 days to count one million edges (about ten thousand seconds). Where the edge count translates to a time that is off by one second for the reference frequency, the one-second difference is equivalent to about one part per million (PPM) in frequency drift that was caused by crystal aging. In a related embodiment, a one-PPM drift (or difference) is also equivalent to a two-second time shift over a 23.2 day period (counting up to two million edges). This can also be extended to a period of 34.8 days (counting up to three million edges), depending on the number of times in one year that verification of frequency drift in the transmitter is desired.

In one example embodiment, the synchronization time stamp is obtained on August $10^{th}$ at 1:00 PM and the calibration time stamp is obtained on August 21 at 2:24 PM; this represents a period of about 11.6 days or a count of one million clock edges of the transmitter signal. The million edge counts is converted to generate an ending time of August 21 at 2:23:59; which is one second behind the calibration time stamp obtained from the time server. A one-second time delay correlates to a one-PPM drift in the reference signal frequency and therefore requires an adjustment at the crystal oscillator circuit. In this example, a predetermined voltage corresponding to a one-PPM drift for this type of crystal is applied to the calibration pin of the oscillator circuit. A two-second time delay or difference between the transmitter and the time server correlates to a two-PPM drift in the reference frequency drift.

Although the present invention has been described with respect to the preferred embodiment, it will be understood that numerous changes and variations to aspects of the invention can be made and that the scope of the present invention is intended to be consistent with the claims as follows.

We claim:

1. A method of compensating for reference frequency drift in a communications device, the communications device having a microprocessor arrangement and a local oscillator circuit adapted to generate a reference frequency signal and operate synchronously with a clock circuit of the microprocessor arrangement, the method comprising:
    a) generating a clock circuit time reference for the clock circuit by dividing the reference frequency signal by a divisor;
    b) obtaining a synchronization time stamp from a networked reference clock arrangement operably connected to the microprocessor arrangement and synchronizing the clock circuit to the synchronization time stamp;
    c) obtaining a calibration time stamp from the networked reference clock arrangement after a predetermined time duration has transpired from synchronization of the clock circuit and comparing the calibration time stamp to a current time of the clock circuit; and
    d) synchronizing the current time of the clock circuit with the calibration time stamp and adjusting the local oscillator circuit as a function of a time variation between the calibration time stamp and the current time of the clock circuit.

2. The method of claim 1, wherein the local oscillator circuit is continuously compensated for frequency drift by repeating steps c) and d).

3. The method of claim 2, wherein the predetermined time duration is defined by the steps of:
    counting a number of repeatable attributes associated with the reference frequency signal after synchronizing the clock circuit; and
    upon reaching a target number of repeatable attributes, determining a time duration corresponding to the target number.

4. The method of claim 3, wherein adjusting the local oscillator circuit comprises:
    correlating a frequency drift value to the time variation between the calibration time stamp and the current time of the clock circuit; and
    responsive to the frequency drift value, adjusting the local oscillator circuit so as to synchronize the local oscillator circuit with the calibration time stamp obtained from the networked reference clock arrangement, wherein the frequency drift value is a function of the target number of repeatable attributes counted in the predetermined time duration.

5. The method of claim 4, wherein the frequency drift value is about one PPM (parts per million) for each second that the current time varies from the calibration time stamp.

6. The method of claim 3 wherein counting the repeatable attributes includes counting clock edges.

7. The method of claim 1, wherein the network reference clock arrangement includes at least one server arrangement adapted to operate with a network time protocol software application.

8. The method of claim 1, wherein obtaining the synchronization and calibration time stamps from the networked reference clock arrangement includes obtaining the time stamps via a wireless communications channel.

9. The method of claim 1, wherein the networked reference clock arrangement includes an atomic clock arrangement.

10. A system for compensating for reference frequency drift in a communications device, the communications device having a microprocessor arrangement and a local oscillator circuit adapted to generate a reference frequency signal and operate synchronously with a clock circuit of the microprocessor arrangement, the system comprising:
    a) means for generating a clock circuit time reference for the clock circuit by dividing the reference frequency signal by a divisor;
    b) means, responsive to generation of the clock circuit time reference, for obtaining a synchronization time stamp from a networked reference clock arrangement operably connected to the microprocessor arrangement and for synchronizing the clock circuit to the synchronization time stamp;
    c) means, responsive to a predetermined time duration transpiring from synchronization of the clock circuit, for obtaining a calibration time stamp from the networked reference clock arrangement and comparing the calibration time stamp to a current time of the clock circuit; and
    d) means, responsive to the calibration time stamp comparison, for synchronizing the current time of the clock circuit with the calibration time stamp and adjusting the local oscillator circuit as a function of a time variation between the calibration time stamp and the current time of the clock circuit.

11. The system of claim 10, further comprising:

means, responsive to synchronizing the clock circuit, for counting a number of repeatable attributes associated with the reference frequency signal; and means, responsive to reaching a target number of repeatable attributes, for determining a time duration corresponding to the target number.

12. The system of claim 10, further comprising means for obtaining the synchronization and calibration time stamps via communications lines from the networked reference clock arrangement, the communication lines being selected from the group consisting of fiber optic cables, coaxial cables and public service telephone network lines.

13. The system of claim 10, further comprising means for obtaining the synchronization and calibration stamps via a wireless communications channel.

14. A reference frequency compensation circuit arrangement having a local crystal oscillator circuit adapted to generate a reference frequency signal, the frequency compensation circuit arrangement comprising:

a dividing circuit adapted to divide the reference frequency signal so as to generate a clock circuit time reference; and a microprocessor arrangement operably connected to a networked reference clock arrangement and having a clock circuit, the microprocessor arrangement adapted to obtain a synchronization time stamp from the networked reference clock arrangement and synchronize the clock circuit time reference to the synchronization time stamp, the microprocessor arrangement also adapted to obtain a calibration time stamp from the networked reference clock arrangement after a predetermined time duration from the synchronization of the clock circuit has transpired and adapted to compare the calibration time stamp to a current time of the clock circuit, the microprocessor arrangement further adapted to synchronize the current time of the clock circuit with the calibration time stamp and adjust the local oscillator circuit as a function of a time variation between the calibration time stamp and the current time of the clock circuit.

15. The frequency compensation circuit arrangement of claim 14, wherein the local crystal oscillator circuit includes a temperature compensated crystal oscillator circuit.

16. The frequency compensation circuit arrangement of claim 14, wherein the dividing circuit further comprises a counting circuit, the counting circuit adapted to be initialized by the microprocessor arrangement after synchronization of the clock circuit with the synchronization time stamp and adapted to count a number of repeatable attributes associated with the reference frequency signal until a target number of repeatable attributes is reached, the microprocessor arrangement further adapted to determine a time duration corresponding to the target number.

17. The frequency compensation circuit arrangement of claim 16, wherein the counting circuit is adapted to count a number of clock edges in the reference frequency signal until reaching the target number, and wherein the microprocessor arrangement is adapted to convert the target number of clock edges to the predetermined time duration.

18. The frequency compensation circuit arrangement of claim 17, further including a digital-to-analog converting circuit operably connected to the local crystal oscillator circuit and adapted to convert a correction signal from the microprocessor arrangement into a reference frequency compensation signal.

19. The frequency compensation circuit arrangement of claim 18, wherein the networked reference clock arrangement and the microprocessor arrangement include a network time protocol application adapted to retrieve the synchronization and calibration time stamps from a network.

20. The frequency compensation circuit arrangement of claim 19, further comprising means for enabling the microprocessor arrangement to communicate via radio frequency signals to the network to obtain the time stamps.

21. The frequency compensation circuit arrangement of claim 16, wherein the microprocessor arrangement is adapted to correlate a frequency drift value to the time variation between the calibration time stamp and the current time, the microprocessor arrangement further adapted to adjust the local crystal oscillator circuit so as to synchronize the local crystal oscillator circuit with the calibration time stamp obtained from the network reference clock arrangement, wherein the frequency drift value is a function of the target number of repeatable attributes counted in the predetermined time duration.

22. The frequency compensation circuit arrangement of claim 21, wherein the frequency drift value is about one PPM (parts per million) for each second that the current time varies from the calibration time stamp.

* * * * *